July 12, 1960  O. J. BUSH  2,944,771
AIR MAT BUMPER PAD
Filed Feb. 11, 1954  4 Sheets-Sheet 1
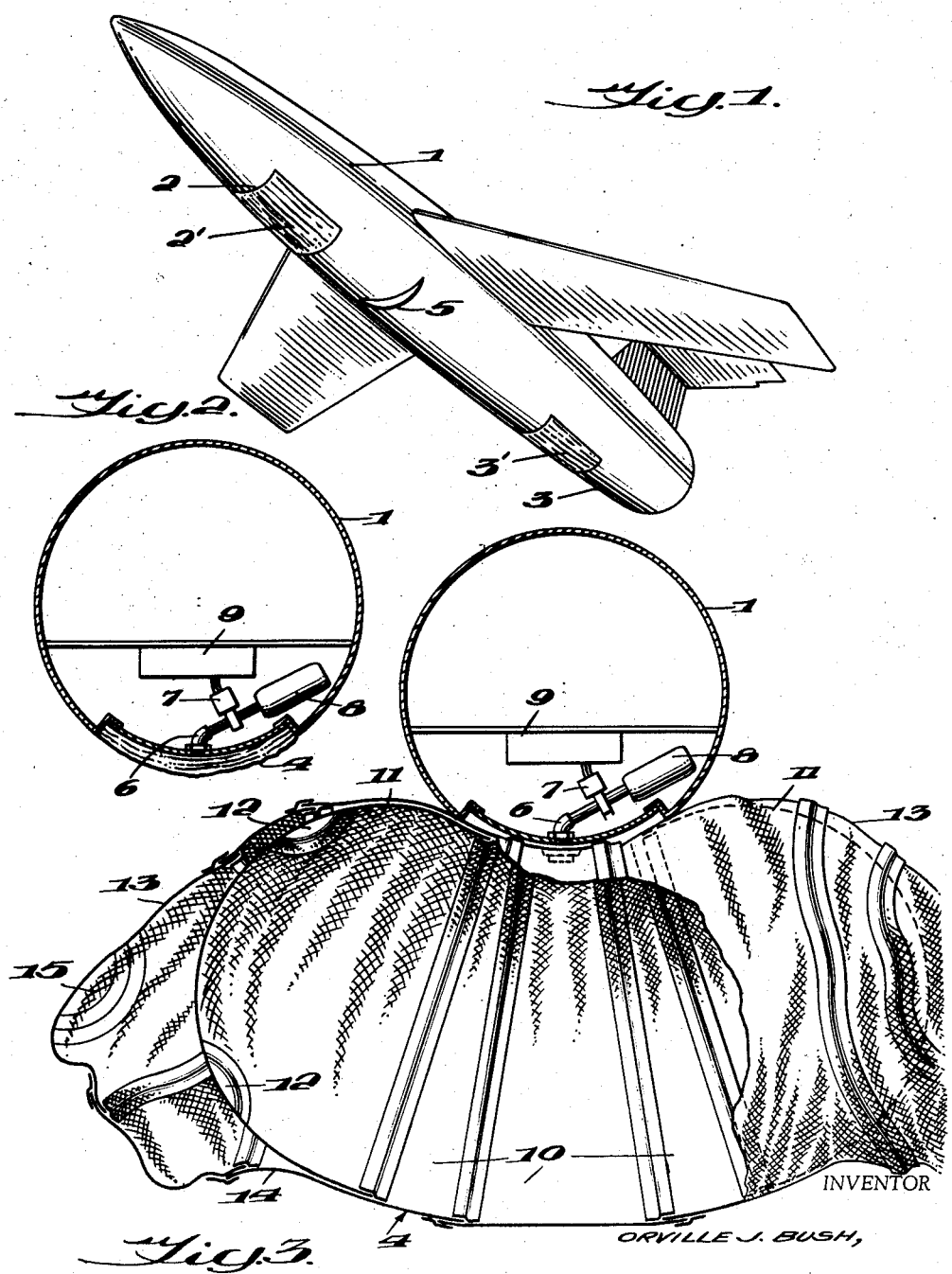
INVENTOR
ORVILLE J. BUSH,
BY Russell L. Root
ATTORNEY

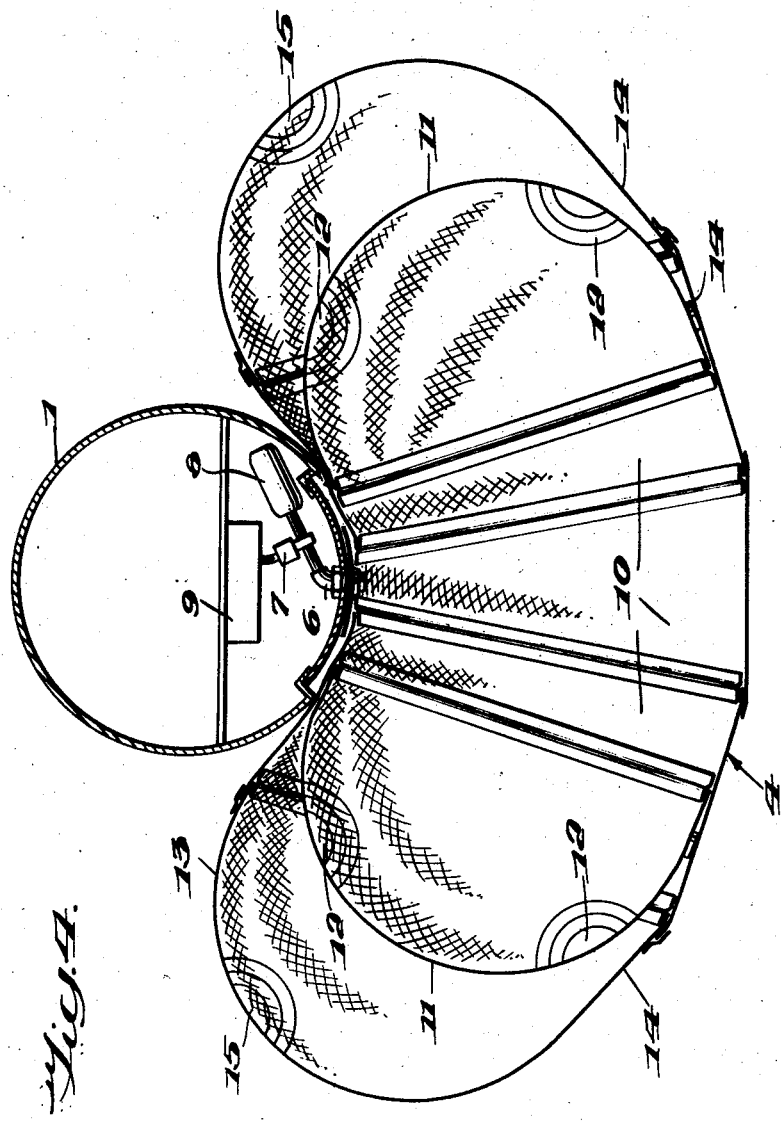

July 12, 1960  O. J. BUSH  2,944,771
AIR MAT BUMPER PAD

Filed Feb. 11, 1954  4 Sheets-Sheet 3

INVENTOR
ORVILLE J. BUSH,

BY  Russell L. Root
ATTORNEY

July 12, 1960　　　O. J. BUSH　　　2,944,771
AIR MAT BUMPER PAD
Filed Feb. 11, 1954　　　　　　　4 Sheets-Sheet 4
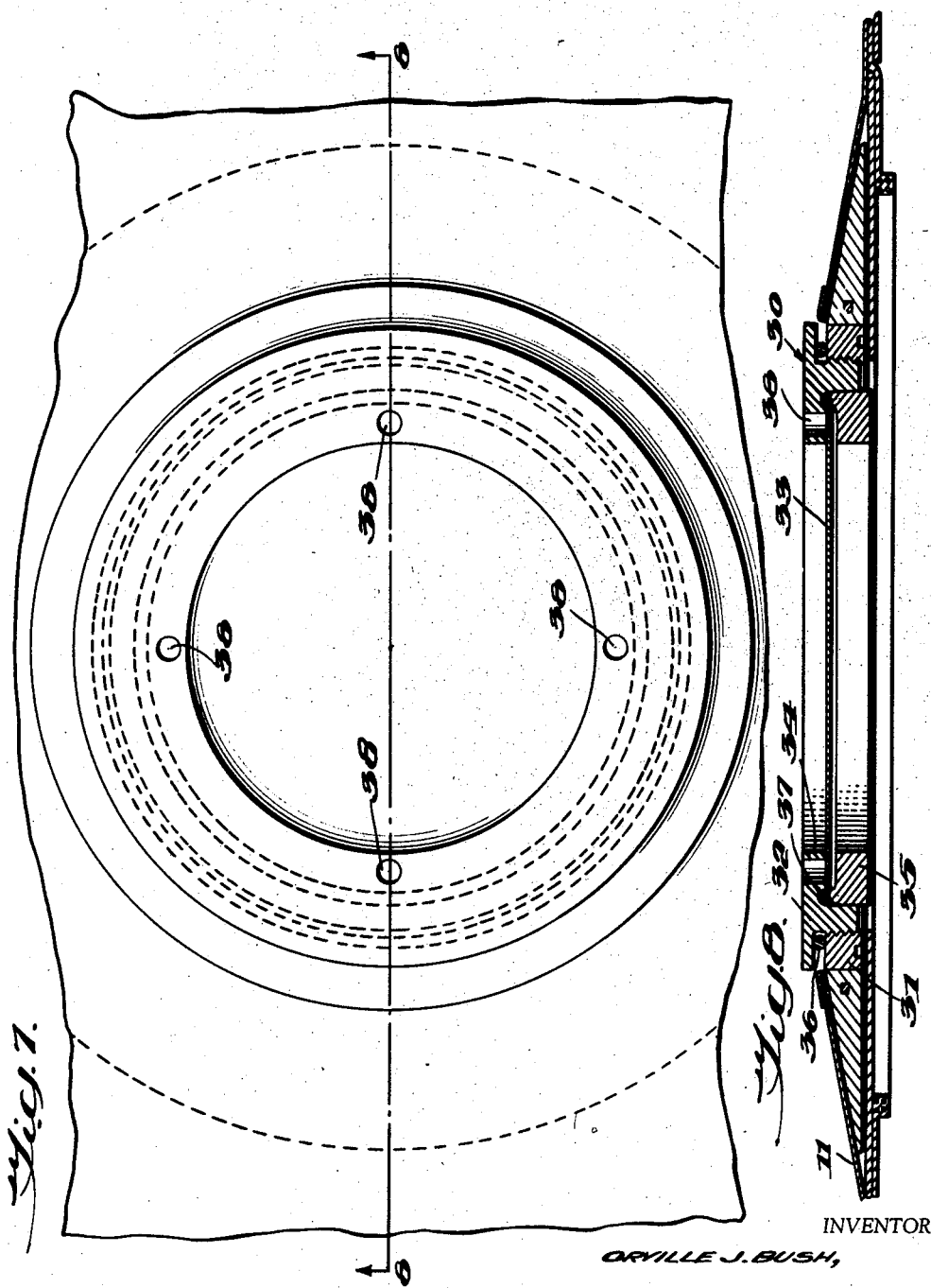
INVENTOR
ORVILLE J. BUSH,
BY Russell L. Root
ATTORNEY

United States Patent Office 2,944,771
Patented July 12, 1960

2,944,771
AIR MAT BUMPER PAD

Orville J. Bush, Joppa, Md., assignor to The Martin Company, Middle River, Md., a corporation of Maryland Filed Feb. 11, 1954, Ser. No. 409,605

11 Claims. (Cl. 244—100)

This invention relates to an air mat bumper pad, particularly adapted for parachute-dropped equipment, but applicable to any equipment where it is desired to absorb shock without rebound or bounce.

Bumper pads of resilient material or pneumatic bags have been used to absorb shock, but in each the kinetic energy stored in the pad in absorbing the shock contributes to the rebound or bounce of the object intended to be cushioned, and the result is a plurality of shocks of lesser amounts until the initial shock is absorbed. The equipment, in the meantime, has suffered the effects of acceleration and deceleration and other possible damage by the uncontrolled rebound.

It is an object of this invention to provide an air mat bumper pad which will absorb the landing shock of large loads with little or no rebound. It is another object of this invention to provide a bumper pad which can be stowed in a very small space and inflated just prior to its being needed. It is a further object of this invention to provide an air mat bumper pad of such a construction that the expendable part can readily be replaced to condition the bumper pad for reuse.

The flexible, compartmentalized pad or bag according to this invention is equipped with a principal inflatable compartment, and at least one supplementary compartment into which the gas contained in the principal compartment can flow for dissipating the shock of impact of the pad or bag with the ground. Advantageously, when the supplementary compartment or compartments have been somewhat inflated with gas from the principal bag due to impact, a buildup of back pressure in the supplementary compartment causes an automatic throttling of the gas flowing into the supplementary compartment from the principal compartment, thereby smoothly dissipating energy and causing the settling velocity of the aircraft or equipment to be brought smoothly to zero, essentially without bounce. Suitable metering orfice means may be provided in the wall of the supplementary compartment as a type of adjustment on the back pressure in the supplementary compartment to allow on occasion some flow of gas to the atmosphere during the terminal part of the settling of the aircraft.

Further and other objects will become apparent from the following specification in which like numerals refer to like parts.

In the drawings:

Fig. 1 shows the bumper pads applied to a missile as part of the recovery system;

Fig. 2 is a sectional view showing the fabric pad folded within a recess in the fuselage;

Fig. 3 shows the pad inflated for use;

Fig. 4 shows the end caps inflated after shock;

Fig. 7 is an enlarged plan view of another form of orifice valve; and

Fig. 8 is a section taken on the line 8—8 of Fig. 7.

Figure 5:
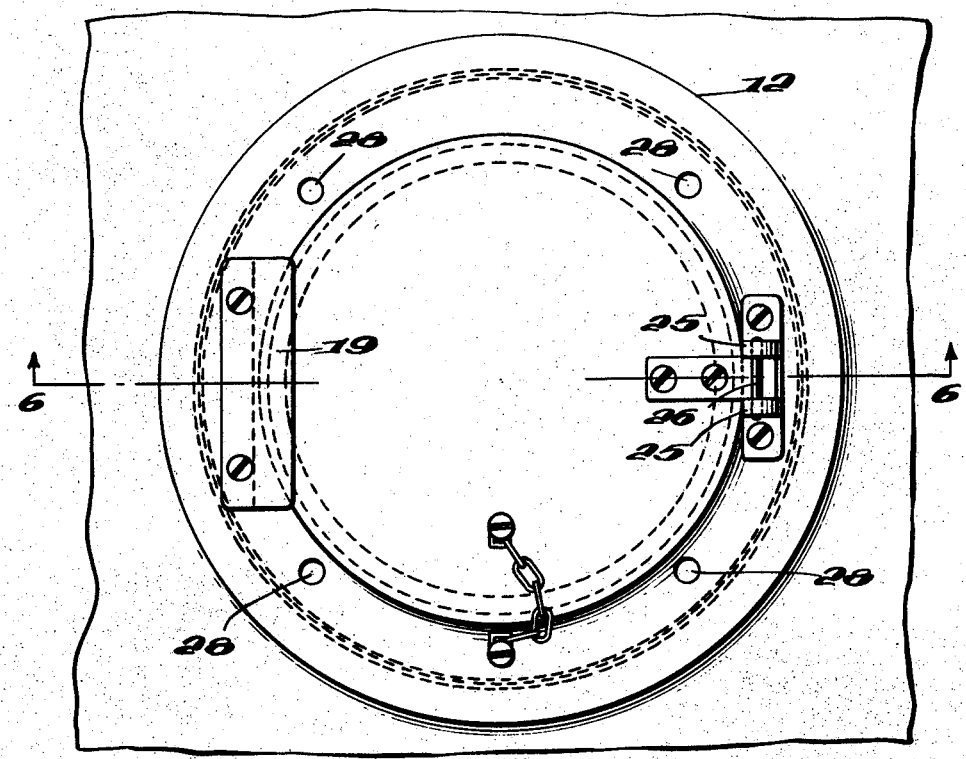
Fig. 5 is an enlarged plan view of one form of orifice valve.

As stated above, this invention is applicable to absorb the shock of impact of any heavy load, particularly such as loads dropped by parachute where it is necessary for the safety of the equipment to cushion the shock and eliminate rebound. The invention is shown in the drawings illustrated in connection with a recovery system of missile 1. In the testing of this missile it is desired to use a parachute recovery system because of the many tests which are required to study take-off characteristics, which, of course, can be accomplished with the same missile if it is recovered. As a part of the recovery system, the missile has built-in on the surface thereof fuselage compartments 2 and 3 in which bag assembly 4 is stowed. Compartment 2 must be flush and the skin 2' over it such that it will not disturb the flow of air into inlet 5 of the missile. Compartment 3 can be mounted on the exterior of the missile with a suitable fairing around skin cover 3', inasmuch as it does not disturb aerodynamic characteristics of the missile.

The section illustrated in Fig. 2 is a section through the forward compartment 2 of the missile, showing the compartment 2 as a recess formed within the fuselage to accommodate the bumper pad. Bag 4 is folded within the recess and a cover or section of skin 2' or 3' is attached to complete the faired fuselage. A gas inlet fitting 6, valve 7 and air bottle 8 mounted within the fuselage are connected to inflate bag assembly 4. Valve 7 is actuated by control 9 to permit the flow of gas from bottle 8 through inlet fitting 6 into bag 4. Valve 7 may be a solenoid-operated valve or any type of valve capable of being controlled by control 9, which may be an electronic control actuated in response to a predetermined signal, or it may be a pressure control to release the gas and inflate the bag assembly 4 at a predetermined altitude.

Bag assembly 4 is shown in Fig. 3 contoured to arcuate shape to accommodate the compartmented pad installation in connection with its use on a missile. It is to be understood that for different applications, the bag will be contoured to suit the particular application. The cross-section will, however, be circular and the ends and end caps hemispherical. The contour of bag shown in Fig. 3 insures the protection of the missile even though landing takes place off the vertical. Bag 4 is made in cylindrical sections 10 from wear-resistant, strong fabric, such as nylon duck, and coated in any suitable fashion to make the bag airtight. End sections 11 are hemispherical in shape. One or more, and usually four, orifice valves 12 are secured in hemispherical sections 11. End caps 13 are attached to cylindrical extensions 14 of the circular portion of the bag. Metering orifice 15 is mounted in end cap 13.

Figure 6:
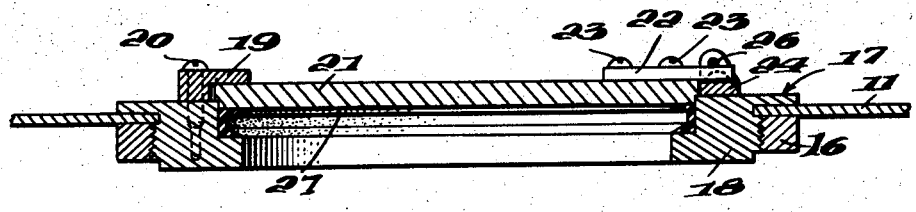
Fig. 6 is a section taken on the line 6—6 of Fig. 5.

As stated above, one or more orifice valves 12 may be mounted in hemispherical portions 11 of the bag assembly 4. Any suitable orifice valve may be employed, but the characteristic of the valve must be such that the valve will open at a predetermined pressure and permit the passage of gas from inflated principal compartment 38 of the bag into the non-inflated end cap defining supplementary compartment 39 with a predetermined quantity of flow. The area of the orifice of the valve and the pressure at which the valve opens must be carefully ascertained in respect of the load with which it may be used and the shock intended to be cushioned or absorbed. Figs. 5 and 6 show a valve adapted to be inserted in hemispherical portion 11. A threaded ring 16 is secured to the fabric of hemispherical portion 11 and affords a mounting for valve assembly 17, which consists of an annular member 18 adapted to be threaded into ring 16. Cleat 19 is secured to ring 18 by screws 20 and is formed to retain the edge of plate 21. Latch 22 is secured by screws 23 to plate 21 and overlays bracket 24 secured to annular member 18 diametrically opposite cleat 19.

Lugs 25 support pin 26 which retains latch 22 on the bracket. A rubber ring seal 27 is placed between annular member 18 and plate 21. The strength in shear of pin 26 is carefully calculated so that the pin 26 will fail in shear when the pressure on cover plate 21 exceeds a predetermined amount.

Holes 28 are drilled into annular member 18 to afford a grip for a spanner wrench so that the whole assembly 17 may be removed from the installation through orifice 15 for replacement of the cover plate 21 and pin 26 after use.

Figs. 7 and 8 illustrate another form of valve 30 which consists of a ring 31 secured to the reinforced structure around an opening in wall 11. Ring 31 is threaded to receive an annular member 32. Foil 33 is held taut across opening 34 by retainer ring 35 which engages annular member 32 with a snug fit. O-ring seals 36 and 37 make the valve assembly air-tight. Holes 38 afford a grip for removal of the valve assembly by means of a spanner wrench.

From the foregoing description it will be apparent that when the principal compartment 38 of the bumper pad 4 is inflated prior to impact as shown in Fig. 3, that upon impact, valves 12 will rupture and the gas from bag 4 will flow freely through valves 12 into end caps 13 defining supplementary compartments 39, which will inflate as shown in Fig. 4. However, metering orifice 15 in end cap 13 will permit the escape of air therefrom at a rate such that the kinetic energy of the gas in bag 4, generated upon impact, will be dissipated through a controlled flow of gas via valves 12 and orifice 15 at a rate of reduction in pressure such that the energy of impact will be absorbed by the bag with substantially no rebound. Metering orifice 15 serves only as a type of adjustment on the back pressure in end caps 13 to control the degree of throttling of the flow through valves 12 for the dissipation of energy.

It is to be understood that certain changes, alterations, modifications and substitutions can be made without departing from the spirit and scope of the appended claims.

I claim:

1. An air mat bumper pad comprising a flexible bag having a plurality of compartments, one compartment adapted to be inflated with a gas, valve means formed in a partition between said inflated compartment and an adjacent compartment, said valve means adapted to be opened to permit the escape of said gas from said inflated compartment to said adjacent compartment when the pressure of said gas in said inflated compartment is increased above a predetermined amount upon said inflated compartment absorbing shock, the flow of gas through said valve means being throttled when the pressure in said adjacent compartment starts to rise above atmospheric pressure, and metering orifice means in an external wall of said adjacent compartment to control the escape of gas therefrom to the atmosphere, whereby the energy absorbed by said gas upon impact is dissipated uniformly via said valve means and said metering orifice means.

2. An air mat bumper pad comprising a flexible bag having a plurality of compartments, one compartment adapted to be inflated with a gas, valve means formed in a partition between said inflated compartment and an adjacent compartment, said valve means comprising a frangible diaphragm mounted in said partition, said valve means adapted to break open to permit the escape of said gas from said inflated compartment to an adjacent compartment when the pressure of said gas in said inflated compartment is increased above a predetermined amount upon said inflated compartment absorbing shock, the flow of gas through said valve means being throttled when the pressure in said adjacent compartment starts to rise above atmospheric pressure.

3. An air mat bumper pad comprising a flexible bag having a plurality of compartments, one compartment adapted to be inflated with a gas, valve means formed in a partition between said inflated compartment and an adjacent compartment, said valve means comprising a frame having an opening formed therein, a closure for said opening, means to secure said closure over the opening in said frame including a shear pin, said valve means adapted to be opened to permit the escape of said gas therefrom to said adjacent compartment when the pressure of said gas in said inflated compartment is increased to an amount sufficient to shear said pin, upon said inflated compartment absorbing shock, the flow of gas through said valve means being throttled when the pressure in said adjacent compartment starts to rise above atmospheric pressure, and a metering orifice in an external wall of said adjacent compartment to control the escape of gas therefrom to the atmosphere.

4. An air mat bumper pad comprising a flexible bag having a plurality of compartments, one compartment being formed generally cylindrical and having generally hemispherical end partitions, and adapted to be inflated with a gas, end caps associated with said end partitions and forming therewith adjacent compartments, valve means formed in said end partitions between said inflated compartment and an adjacent compartment, said valve means adapted to be opened to permit the escape of said gas from said inflated compartment to an adjacent compartment when the pressure of said gas in said inflated compartment is increased above a predetermined amount upon said inflated compartment absorbing shock, the flow of gas through said valve means being throttled when the pressure in said adjacent compartment starts to rise above atmospheric pressure.

5. In a missile recovery system, an air mat bumper pad adapted to be stowed within said missile, a source of compressed gas in said missile, valve means to control the flow of said gas to said pad, control means to open said valve means while said missile is in flight, said air mat bumper pad comprising a flexible bag having a plurality of compartments, one compartment adapted to be inflated with said gas, throttling valve means formed in a partition between said inflated compartment and an adjacent compartment, said throttling valve means adapted to be opened to permit the escape of said gas from said inflated compartment to an adjacent compartment when the pressure of said gas in said inflated compartment is increased above a predetermined amount upon said inflated compartment absorbing shock, the flow of gas through said throttling valve means being throttled when the pressure in said adjacent compartment starts to rise above atmospheric pressure.

6. In a missile recovery system, an air mat bumper pad adapted to be stowed within said missile, a source of compressed gas in said missile, valve means to control the flow of said gas to said pad, control means to open said valve means while said missile is in flight, said air mat bumper pad comprising a flexible bag having a plurality of compartments, one compartment adapted to be inflated with said gas, throttling valve means formed in a partition between said inflated compartment and an adjacent compartment, said throttling valve means adapted to be opened to permit the escape of said gas from said inflated compartment to said adjacent compartment when the pressure of said gas in said inflated compartment is increased above a predetermined amount upon said inflated compartment absorbing shock, the flow of gas through said throttling valve means being throttled when the pressure in said adjacent compartment starts to rise above atmospheric pressure, and metering orifice means in an external wall of said adjacent compartment to control the escape of gas therefrom to the atmosphere, whereby the energy absorbed by said gas upon impact is dissipated uniformly via said throttling valve means and said metering orifice means.

7. In a missile recovery system, an air mat bumper pad adapted to be stowed within said missile, a source of compressed gas in said missile, valve means to control the flow of said gas to said pad, control means to open said valve means while said missile is in flight, said air mat bumper pad comprising a flexible bag having a plurality of compartments, one compartment adapted to be inflated with said gas, throttling valve means formed in a partition between said inflated compartment and an adjacent compartment, said valve means comprising a frangible diaphragm mounted in said partition, said throttling valve means adapted to break open to permit the escape of said gas from said inflated compartment to an adjacent compartment when the pressure of said gas in said inflated compartment is increased above a predetermined amount upon said inflated compartment absorbing shock, the flow of gas through said throttling valve means being throttled when the pressure in said adjacent compartment starts to rise above atmospheric pressure.

8. In a missile recovery system, an air mat bumper pad adapted to be stowed within said missile, a source of compressed gas in said missile, valve means to control the flow of said gas to said pad, control means to open said valve means while said missile is in flight, said air mat bumper pad comprising a flexible bag having a plurality of compartments, one compartment adapted to be inflated with said gas, throttling valve means formed in a partition between said inflated compartment and an adjacent compartment, said throttling valve means comprising a frame having an opening formed therein, a closure for said opening, means to secure said closure over the opening in said frame, including a shear pin, said throttling valve means adapted to be opened to permit the escape of said gas therefrom to said adjacent compartment when the pressure of said gas in said inflated compartment is increased to an amount sufficient to shear said pin, upon said inflated compartment absorbing shock, the flow of gas through said throttling valve means being throttled when the pressure in said adjacent compartment starts to rise above atmospheric pressure and a metering orifice in an external wall of said adjacent compartment to control the escape of gas therefrom to the atmosphere.

9. In a missile recovery system, an air mat bumper pad adapted to be stowed within said missile, a source of compressed gas in said missile, valve means to control the flow of said gas to said pad, control means to open said valve means while said missile is in flight, said air mat bumper pad comprising a flexible bag having a plurality of compartments, one compartment being formed generally cylindrical and having generally hemispherical end partitions, and adapted to be inflated with said gas, end caps associated with said end partitions and forming therewith adjacent compartments, throttling valve means formed in said end partitions between said inflated compartments and an adjacent compartment, said throttling valve means adapted to be opened to permit the escape of said gas from said inflated compartment to an adjacent compartment when the pressure of said gas in said inflated compartment is increased above a predetermined amount upon said inflated compartment absorbing shock, the flow of gas through said throttling valve means being throttled when the pressure in said adjacent compartment starts to rise above atmospheric pressure.

10. In a missile recovery system, a plurality of air mat bumper pads adapted to be carried by said missile in flight, a source of compressed gas in said missile, valve means to control the flow of said gas to said pads, control means to open said valve means when said missile is at a predetermined altitude, said air mat bumper pad comprising a flexible bag having a plurality of compartments, one compartment adapted to be inflated with said gas, throttling valve means formed in a partition between said inflated compartment and an adjacent compartment, said throttling valve means adapted to be opened to permit the escape of said gas from said inflated compartment to an adjacent compartment when the pressure of said gas in said inflated compartment is increased above a predetermined amount upon said inflated compartment absorbing shock, the flow of gas through said throttling valve means being throttled when the pressure in said adjacent compartment starts to rise above atmospheric pressure.

11. An aircraft air mat bumper pad having high load-stroke efficiency comprising a flexible bag having a principal inflatable compartment adapted to be inflated with a gas, and at least one normally non-inflated supplementary compartment attached to said principal compartment, a partition separating said compartments, throttling valve means disposed in the partition between said compartments and adapted to be opened to permit the escape of gas from the inflated principal compartment into said supplementary compartment when the pressure of the gas in said principal compartment is increased above a pre-determined amount upon said bag absorbing landing shock, said supplementary compartment, upon being inflated with gas from said principal compartment, undergoing a buildup of back pressure therein, said buildup of back pressure causing an automatic throttling of the flow of gas from said principal compartment through said throttling valve means, thereby causing the settling velocity of the aircraft to be brought smoothly to zero.

References Cited in the file of this patent

UNITED STATES PATENTS

| | | |
|---|---|---|
| 1,503,386 | Stahl | July 29, 1924 |
| 1,694,873 | Brunner | Sept. 3, 1926 |
| 2,427,445 | Davidson | Sept. 16, 1947 |
| 2,706,605 | Rose et al. | Apr. 19, 1955 |
| 2,713,466 | Fletcher et al. | July 19, 1955 |

FOREIGN PATENTS

| | | |
|---|---|---|
| 197,803 | Great Britain | May 24, 1923 |
| 311,099 | Germany | Feb. 25, 1919 |